United States Patent
Di Nicola (10) Patent No.: US 11,164,182 B2
(45) Date of Patent: Nov. 2, 2021

(54) METHODS AND SYSTEMS FOR SAFE CREATION, CUSTODY, RECOVERY, AND MANAGEMENT OF A DIGITAL ASSET

(71) Applicant: Conio Inc., San Francisco, CA (US)

(72) Inventor: Vincenzo Di Nicola, Bothell, WA (US)

(73) Assignee: Conio Inc., San Francisco, CA (US)

( * ) Notice: Subject to any disclaimer, the term of this patent is extended or adjusted under 35 U.S.C. 154(b) by 234 days.

(21) Appl. No.: 16/399,872

(22) Filed: Apr. 30, 2019

(65) Prior Publication Data

US 2019/0354972 A1 Nov. 21, 2019

Related U.S. Application Data

(60) Provisional application No. 62/672,976, filed on May 17, 2018.

(51) Int. Cl.
| | | |
|---|---|---|
| *G06Q 20/38* | (2012.01) | |
| *H04L 9/32* | (2006.01) | |
| *H04L 9/08* | (2006.01) | |

(52) U.S. Cl.
CPC ..... *G06Q 20/3829* (2013.01); *G06Q 20/3825* (2013.01); *H04L 9/085* (2013.01);
(Continued)

(58) Field of Classification Search
CPC ............ G06Q 20/3829; G06Q 20/3825; H04L 9/3218; H04L 9/0861; H04L 9/0897; H04L 9/085
See application file for complete search history.

(56) References Cited

U.S. PATENT DOCUMENTS

| | | |
|---|---|---|
| 5,265,164 A | 11/1993 | Matyas et al. |
| 5,485,519 A | 1/1996 | Weiss |

(Continued)

FOREIGN PATENT DOCUMENTS

| | | |
|---|---|---|
| EP | 3794536 A1 | 3/2021 |
| WO | WO2016077121 A1 | 5/2016 |

(Continued)

OTHER PUBLICATIONS

"International Search Report" and "Written Opinion of the International Searching Authority," Patent Cooperation Treaty App. No. PCT/US2017/049209, dated Nov. 20, 2017, 11 pages.

(Continued)

*Primary Examiner* — Jacob C. Coppola
(74) *Attorney, Agent, or Firm* — Carr & Ferrell LLP (57) ABSTRACT

Embodiments of the present technology pertain to systems and methods for secure creation, custody, recovery, and management of a digital asset. Embodiments include receiving a custody request for a master private key. Embodiments further include dividing the master private key into a plurality master private key portions using a cryptographic algorithm, the cryptographic algorithm comprising a threshold number of the plurality master private key portions necessary for later reconstruction of the master private key, the threshold number of the plurality master private key portions being a subset of the plurality master private key portions. Embodiments further include reconstructing the master private key using the plurality master private key portions on the plurality of individual physical devices, the reconstructing the master private key requiring the threshold number of the plurality master private key portions; and transacting a digital asset by signing a transaction using the reconstructed master private key.

17 Claims, 7 Drawing Sheets

(52) U.S. Cl.
CPC .......... *H04L 9/0861* (2013.01); *H04L 9/0897* (2013.01); *H04L 9/3218* (2013.01)

(56) References Cited

U.S. PATENT DOCUMENTS

| | | | |
|---|---|---|---|
| 5,588,061 | A * | 12/1996 | Ganesan ................. H04L 9/085 |
| | | | 380/285 |
| 5,835,592 | A | 11/1998 | Chang et al. |
| 9,189,777 | B1 * | 11/2015 | Dickinson ............... G06F 21/31 |
| 10,373,129 | B1 | 8/2019 | James et al. |
| 10,547,441 | B2 | 1/2020 | Di Nicola et al. |
| 2004/0236694 | A1 | 11/2004 | Tattan et al. |
| 2006/0106754 | A1 | 5/2006 | Blumenau et al. |
| 2007/0014399 | A1 | 1/2007 | Scheidt et al. |
| 2007/0143210 | A1 * | 6/2007 | Yeung ................. H04L 63/0428 |
| | | | 705/50 |
| 2008/0075288 | A1 | 3/2008 | Kamijoh et al. |
| 2008/0162935 | A1 | 7/2008 | Ginzboorg et al. |
| 2009/0144557 | A1 | 6/2009 | Sutton |
| 2010/0088521 | A1 | 4/2010 | Koplow |
| 2010/0111308 | A1 | 5/2010 | Forsberg et al. |
| 2013/0124870 | A1 | 5/2013 | Rosati et al. |
| 2013/0159732 | A1 | 6/2013 | Leoutsarakos |
| 2013/0198519 | A1 | 8/2013 | Marien et al. |
| 2013/0203384 | A1 * | 8/2013 | Narasimhan .......... H04W 12/04 |
| | | | 455/411 |
| 2015/0170112 | A1 | 6/2015 | Decastro |
| 2015/0262171 | A1 | 9/2015 | Langschaedel et al. |
| 2015/0348017 | A1 | 12/2015 | Allmen |
| 2016/0127336 | A1 | 5/2016 | Cignetti et al. |
| 2018/0069697 | A1 | 3/2018 | Di Nicola et al. |
| 2018/0293557 | A1 * | 10/2018 | Kim ................... G06Q 20/3823 |
| 2018/0367316 | A1 | 12/2018 | Cheng et al. |
| 2019/0007205 | A1 * | 1/2019 | Corduan ............... G06Q 20/367 |
| 2019/0220859 | A1 * | 7/2019 | Weight ................. G06Q 20/381 |
| 2019/0327085 | A1 * | 10/2019 | Patel .................... G06F 21/6209 |
| 2019/0354972 | A1 * | 11/2019 | Di Nicola ............ H04L 9/3218 |
| 2021/0158444 | A1 | 5/2021 | Di Nicola et al. |

FOREIGN PATENT DOCUMENTS

| | | |
|---|---|---|
| WO | WO2017145016 A1 | 8/2017 |
| WO | WO2018044946 A1 | 3/2018 |
| WO | WO2018229608 A1 | 12/2018 |
| WO | WO2019221956 A1 | 11/2019 |
| WO | WO2021102041 A1 | 5/2021 |

OTHER PUBLICATIONS

Dwyer, Gerald P., "The Economics of Bitcoin and Similar Private Digital Currencies," 2014 [retrieved on Oct. 19, 2017], Retrieved from the Internet: <URL:http://mpra.ub.unii-muenchen.de/57360/3/MPRA_paper_57360.pdf>, 31 pages.

"International Search Report" and "Written Opinion of the International Searching Authority," Patent Cooperation Treaty App. No. PCT/US2019/030900, dated Jul. 17, 2019, 7 pages.

"Extended European Search Report" and "Written Opinion", European Application No. 17847407.8, dated Feb. 25, 2020, 8 pages.

"International Search Report" and "Written Opinion of the International Searching Authority," Patent Cooperation Treaty App. No. PCT/US2020/061111, dated Mar. 23, 2021, 9 pages.

* cited by examiner

METHODS AND SYSTEMS FOR SAFE CREATION, CUSTODY, RECOVERY, AND MANAGEMENT OF A DIGITAL ASSET

CROSS REFERENCE TO RELATED APPLICATION

This patent application claims the priority benefit of U.S. Provisional Patent Application Ser. No. 62/672,976 filed on May 17, 2018 and titled "Method and Apparatus for Safe Creation, Custody, Recovery and Management of a Digital Asset," which is hereby incorporated by reference in its entirety.

FIELD OF THE TECHNOLOGY

Embodiments of the disclosure relate to digital assets. In particular, the present disclosure relates to systems and methods for providing secure creation, custody, recovery, and management of a digital asset.

SUMMARY

According to some embodiments, the present technology is directed to a method for secure creation, custody, recovery, and management of a digital asset. In various embodiments the method comprises: (a) receiving a request to generate a master private key; (b) generating a master private key; (c) receiving a custody request for the master private key; (d) dividing the master private key into a plurality master private key portions using a cryptographic algorithm in response to the receiving the custody request for the master private key, the cryptographic algorithm comprising a threshold number of the plurality master private key portions necessary for later reconstruction of the master private key, the threshold number of the plurality master private key portions being a subset of the plurality master private key portions; (e) storing the plurality master private key portions on a plurality of individual physical devices with each master private key portion of the plurality master private key portions stored on a separate individual physical device; (f) reconstructing the master private key using the plurality master private key portions on the plurality of individual physical devices, the reconstructing the master private key requiring the threshold number of the plurality master private key portions necessary for generation of the reconstructed master private key, the threshold number of the plurality master private key portions being the subset of the plurality master private key portions; (g) transacting a digital asset by signing a transaction using the reconstructed master private key; and (h) transacting a digital asset by signing a transaction using a private key derived from the reconstructed master private key.

In some embodiments the digital asset is a cryptocurrency.

In various embodiments the transacting the digital asset is transferring the digital asset.

In some embodiments the cryptographic algorithm is Shamir's Secret Sharing (SSS).

In various embodiments each of the plurality of individual physical devices further comprise a Hardware Security Module (HSM).

In some embodiments the storing the plurality master private key portions on the plurality of individual physical devices further comprises using the Hardware Security Module (HSM) on each of the plurality of individual physical devices.

In various embodiments the generating the master private key comprises: receiving a request to generate the master private key; securely connecting a plurality of physical devices, the plurality of physical devices generating a plurality of digital secrets, the plurality of digital secrets corresponding to the plurality of physical devices; and randomly selecting a master physical device of the plurality of individual physical devices, the master physical device generating the master private key using the plurality of digital secrets of each of the plurality of physical devices in response to the request to generate the master private key.

In various embodiments the custody of the master private key comprises: receiving a custody request for the master private key; securely connecting a plurality of physical devices; dividing the master private key into a plurality master private key portions using a cryptographic algorithm; storing different plurality master private key portions on a plurality of individual physical devices allowing for later reconstruction of the master private key using a threshold number of the plurality master private key portions.

In some embodiments the transacting the digital asset by signing the transaction using the reconstructed master private key comprises: receiving a request to sign a message; signing the message, by the master physical device, using the reconstructed master private key in response to the request to sign the message; and sharing content of the message in response to the signing the message.

In various embodiments methods of the present technology further comprise generating a master public key corresponding to the master private key.

In some embodiments the transacting the digital asset by signing the transaction using a private key derived by the reconstructed master private key comprises: receiving a request to sign a message and additional information to derive the private key; signing the message, by the master physical device, using the private key derived by the reconstructed master private key in response to the request to sign the message; and sharing content of the message in response to the signing the message.

In various embodiments methods of the present technology further comprise generating a public key corresponding to the private key derived from the master private key.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

DETAILED DESCRIPTION

In the following description, for purposes of explanation, numerous specific details are set forth in order to provide a thorough understanding of the disclosure. It will be apparent, however, to one skilled in the art, that the disclosure may be practiced without these specific details. In other instances, structures and devices may be shown in block diagram form only in order to avoid obscuring the disclosure. It should be understood that the disclosed embodiments are merely exemplary of the invention, which may be embodied in multiple forms. Those details disclosed herein are not to be interpreted in any form as limiting, but as the basis for the claims.

Digital assets (e.g., cryptocurrencies such as Bitcoin, or tokens created with certain blockchains) are at their core defined by a single public key and private key pair. A digital asset transaction (e.g., a digital asset transfer) is digitally signed with the original owner's private key, and any external observer can verify it by using the corresponding public key.

In various embodiments, a public key maybe communicated to the whole world, while the private key must be kept private by the owner. If the private key is lost, the owner can no longer access his/her digital asset. If the private key is given to or copied by someone else, that someone else can transact the digital asset using the private key, effectively stealing it from the owner.

In order to prevent the loss of the private key, or prevent someone else transacting the digital asset using the private key, a number of approaches have been suggested to safeguard the private key. For example, dividing the private key into multiple parts, making multiple copies of each part of the private key, and storing the multiple parts in different secure places. Such approaches are limited because they are manual, require a "ceremony" with physical presence of several operators in the same place, and the loss of a part of the private key may still result in the total loss of the private key. Thus, there is a need for new approaches to safeguard private keys.

In various embodiments the present technology allows for a safe creation, custody, recovery, and management of a digital asset. The present technology does not require operators to be on premise in a special location and the present technology is resistant to loss of parts of the private key. The present technology does not even require anyone to know what the private key is, and the present technology still allows transactions of the digital asset. By applying methods of the present technology, systems of the present technology effectively prevent the loss or theft of digital assets and also allow solving special real-life situations like transfer of a digital asset to an heir.

Figure 1:
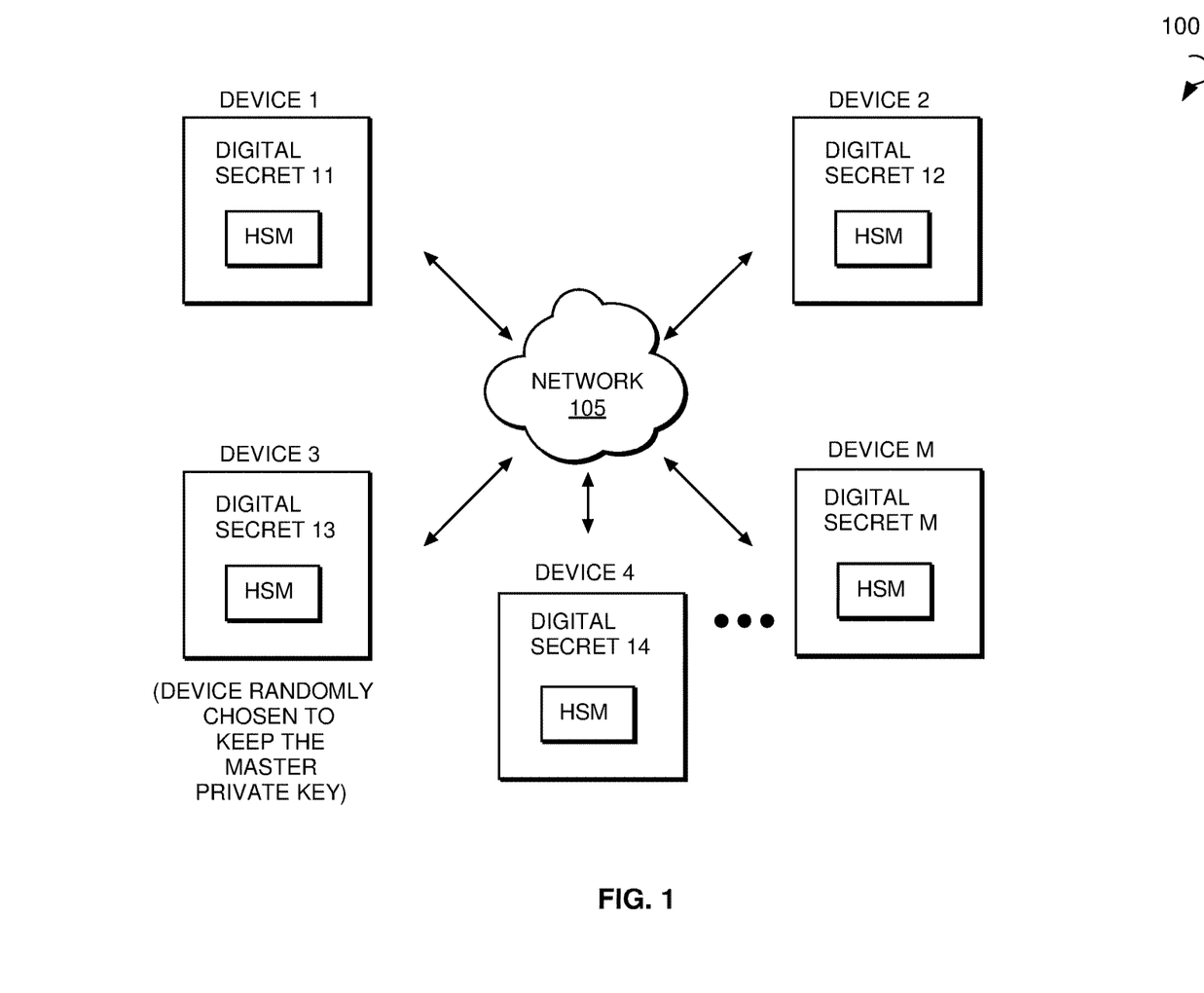
FIG. 1 shows a diagram of an exemplary system including a randomly selected master physical device of the plurality of individual physical devices with the master physical device generating the master private key according to embodiments of the present technology.

FIG. 1 shows a diagram of an exemplary system 100 including a randomly selected master physical device of the plurality of individual physical devices with the master physical device generating the master private key according to embodiments of the present technology. The exemplary system 100 shows M physical devices. For example, M physical devices comprise Device 1, Device 2, Device 3, Device 4, . . . and Device M, as shown in FIG. 1. In various embodiments, each of the M physical devices comprises a Hardware Security Module (HSM). For example, the HSM is a physical computing device that safeguards and manages digital keys and provides cryptoprocessing. The HSM may be in a form of a plug-in card or an external device that attaches directly to a computer or a network server. To be sure, each physical device of M physical devices may be replaced with, or take the form of, any suitable computing device, such as those described To be sure, each physical device of M physical devices may be replaced with, or take the form of, any suitable computing device, such as those described with respect to FIG. 7.

In various embodiments, the M physical devices are connected to network 105. The network 105 may include a wireless or wire network, or a combination thereof. For example, the network 105 may include one or more of the following: the Internet, local intranet, PAN (Personal Area Network), LAN (Local Area Network), WAN (Wide Area Network), MAN (Metropolitan Area Network), virtual private network (VPN), storage area network (SAN), frame relay connection, Advanced Intelligent Network (AIN) connection, synchronous optical network (SONET) connection, digital T1, T3, E1 or E3 line, Digital Data Service (DDS) connection, DSL (Digital Subscriber Line) connection, Ethernet connection, ISDN (Integrated Services Digital Network) line, dial-up port such as a V.90, V.34 or V.34bis analog modem connection, cable modem, ATM (Asynchronous Transfer Mode) connection, or an FDDI (Fiber Distributed Data Interface) or CDDI (Copper Distributed Data Interface) connection. Furthermore, the communications may also include links to any of a variety of wireless networks including, WAP (Wireless Application Protocol), GPRS (General Packet Radio Service), GSM (Global System for Mobile Communication), CDMA (Code Division Multiple Access) or TDMA (Time Division Multiple Access), cellular phone networks, GPS, CDPD (cellular digital packet data), RIM (Research in Motion, Limited) duplex paging network, Bluetooth radio, or an IEEE 802.11-based radio frequency network. The network can further include or interface with any one or more of the following: RS-232 serial connection, IEEE-1394 (Firewire) connection, Fiber Channel connection, IrDA (infrared) port, SCSI (Small Computer Systems Interface) connection, USB (Universal Serial Bus) connection, or other wired or wireless, digital or analog interface or connection, mesh or Digi® networking.

In various embodiments, the M physical devices have each generated a digital secret. For example, Device 1 has generated digital secret 11, Device 2 has generated digital secret 12, Device 3 has generated digital secret 13, Device 4 has generated digital secret 14, . . . and Device M has generated digital secret M, as shown in FIG. 1.

In various embodiments the M physical devices are securely connected with each other using network 105. In some embodiments, one of the M physical devices is randomly chosen as a master device. For example, the exemplary system 100 of FIG. 1 shows Device 3 as the randomly chosen master device. The randomly chosen master device generates a private key using the M digital secrets as inputs.

In various embodiments, the exemplary system 100 generates a master public key corresponding to the master private key.

Figure 2:
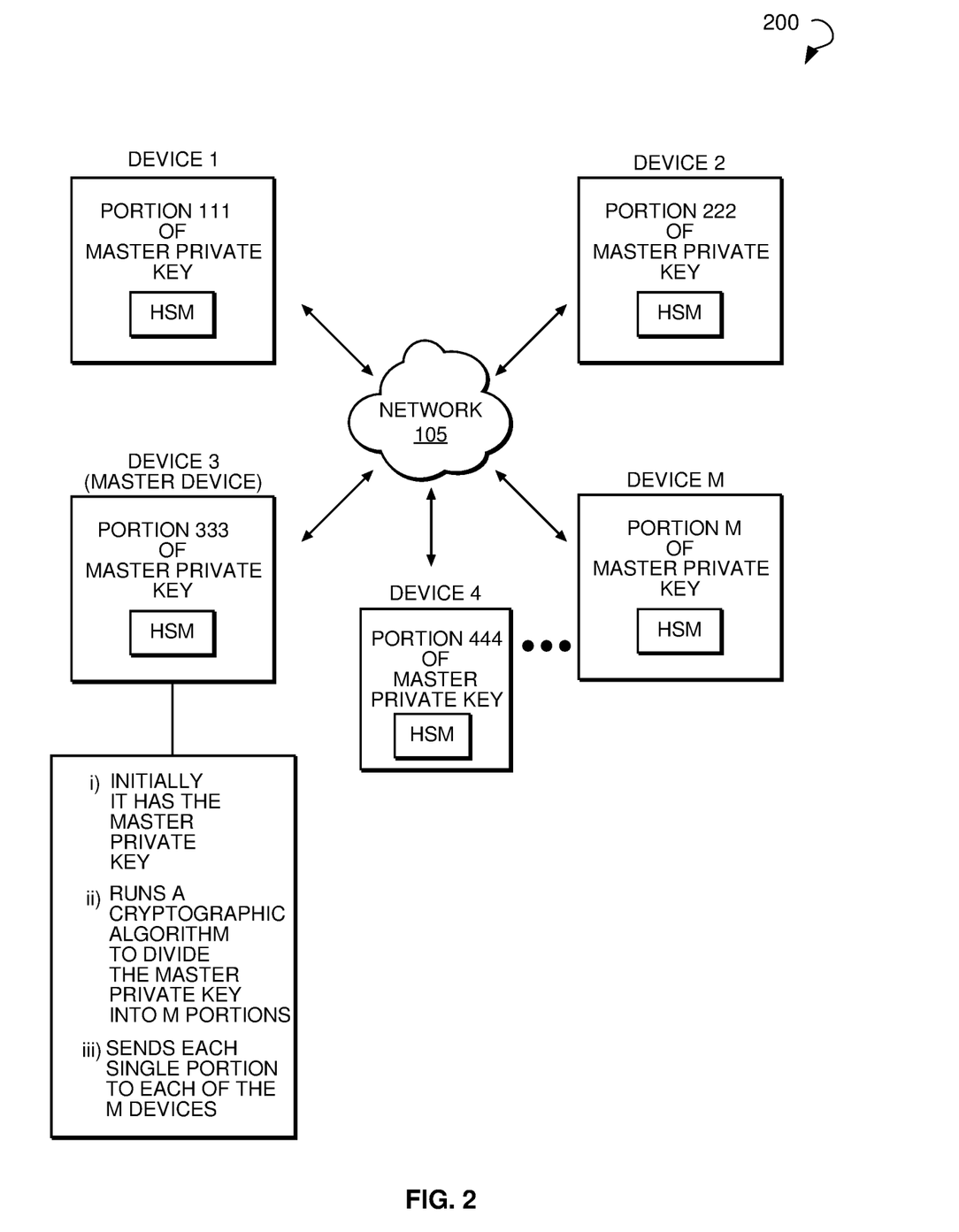
FIG. 2 illustrates a diagram of an exemplary system including a plurality of private key portions stored on a plurality of individual physical devices with each master private key portion of the plurality master private key portions stored on a separate individual physical device according to embodiments of the present technology.

FIG. 2 illustrates a diagram of an exemplary system 200 including a plurality of private key portions stored on a plurality of individual physical devices with each master private key portion of the plurality master private key portions stored on a separate individual physical device according to embodiments of the present technology.

The exemplary system 200 shows M physical devices. For example, M physical devices comprise Device 1, Device 2, Device 3, Device 4, . . . and Device M as shown in FIG. 2. In various embodiments, each of the M physical devices comprises an HSM as described above in FIG. 1. In various embodiments, the M physical devices are connected to network 105 as described above in FIG. 1. In FIG. 2, Device 3 is shown as the randomly chosen master device that comprises the master private key. The master device runs a cryptographic algorithm, divides the master private key into M portions, and sets rules for recovery for the master private key.

FIG. 2 shows Device 3 (i.e., the master device) has sent each a single portion of the master private key to each one of the M devices. For example, Device 1 has received portion 111 of the master private key, Device 2 has received portion 222 of the master private key, Device 3 has received portion 333 of the master private key, Device 4 has received portion 444 of the master private key, . . . and Device M has received portion M of the master private key.

In various embodiments the exemplary system 200 receives a custody request to take custody of the master private key. The master private key may be initially temporarily stored on a physical device (e.g., stored on the master device). The master device (e.g., Device 3), using one or more cryptographic algorithms, divides the master private key into M portions, and sets cryptographic rules for being able to recover the master private key later. An exemplary cryptography algorithm is Shamir's Secret Sharing algorithm (SSS algorithm). One example of cryptographic rule is to allow recovery of the master private key by using a subset K of the M physical devices (i.e., with K being a subset of M). For instance, if M is five, K could be three portions of M, thus, K is a subset of the total portions of M. For example, K is a parameter of an algorithm comprising a threshold number of the plurality master private key portions necessary for later reconstruction of the master private key, the threshold number of the plurality master private key portions being a subset of the plurality master private key portions. The M physical devices are securely connected using the network 105, and each one of the M physical devices receives and stores one of the M portions of the master private key (e.g., Device 1 has received portion 111 of the master private key, Device 2 has received portion 222 of the master private key, Device 3 has received portion 333 of the master private key, Device 4 has received portion 444 of the master private key, . . . and Device M has received portion M of the master private key).

Figure 3:
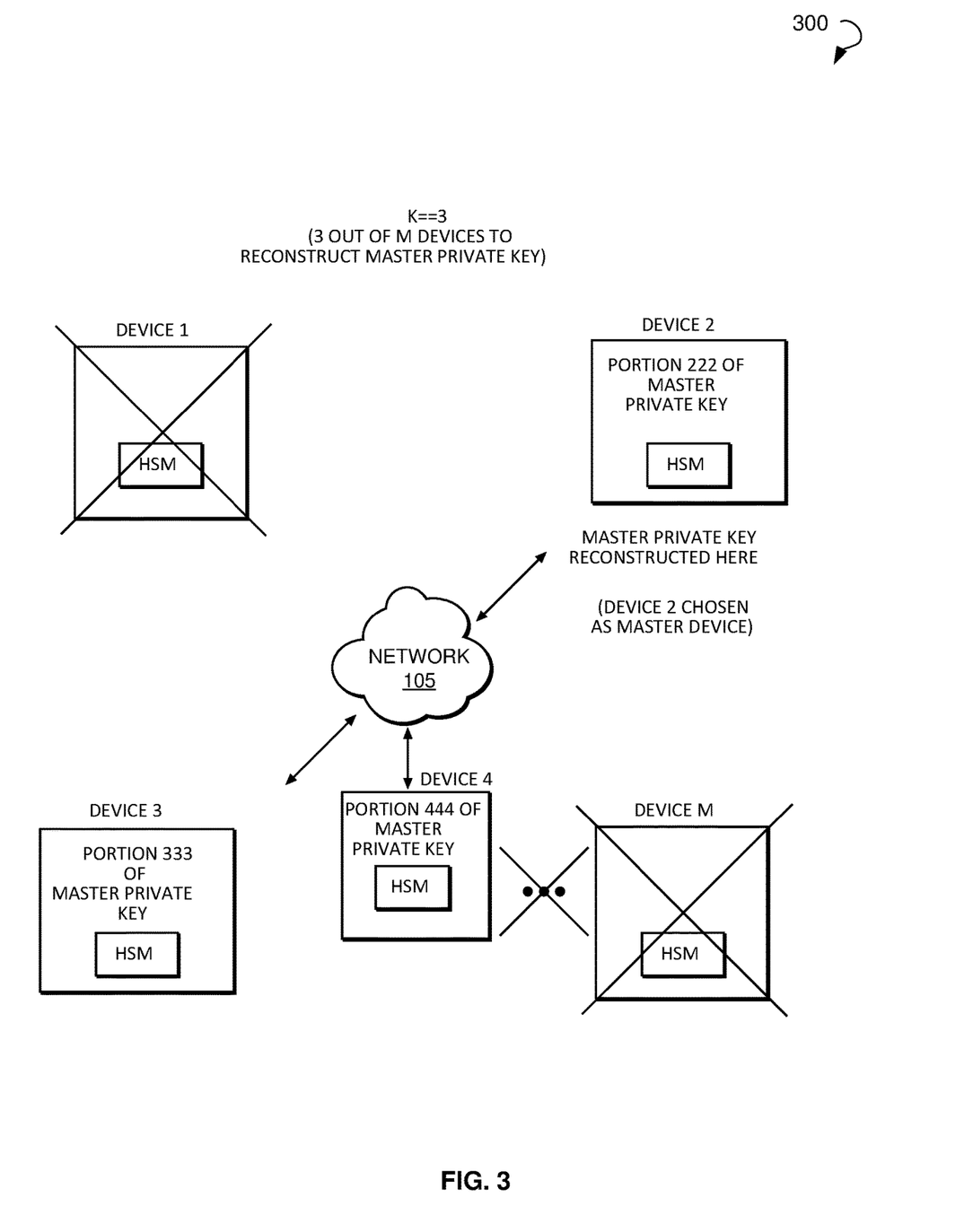
FIG. 3 shows another diagram of an exemplary system including a randomly selected master physical device of the plurality of individual physical devices with the master physical device reconstructing the master private key according to embodiments of the present technology.

FIG. 3 shows another diagram of an exemplary system 300 including a randomly selected master physical device of the plurality of individual physical devices with the master physical device reconstructing the master private key according to embodiments of the present technology. FIG. 3 shows K physical devices, each with art HSM, connected to the network 105. Again, K is a parameter of an algorithm comprising a threshold number of the plurality master private key portions necessary for later reconstruction of the master private key, the threshold number of the plurality master private key portions being a subset of the plurality master private key portions. As art example, FIG. 3 shows K equal to three, thus, three physical devices, Device 2, Device 3, and Device 4 are necessary for reconstructing the master private key. As an example, FIG. 3 shows Device 2 as the master device. The master device (e.g., Device 2) receives portion 333 of the master private key from Device 3 and portion 444 of the master private key from Device 4. The Device 2 (i.e., the master device) runs the recovery procedure of the cryptographic algorithm used initially (e.g. SSS algorithm), and reconstructs the master private key.

Figure 4:
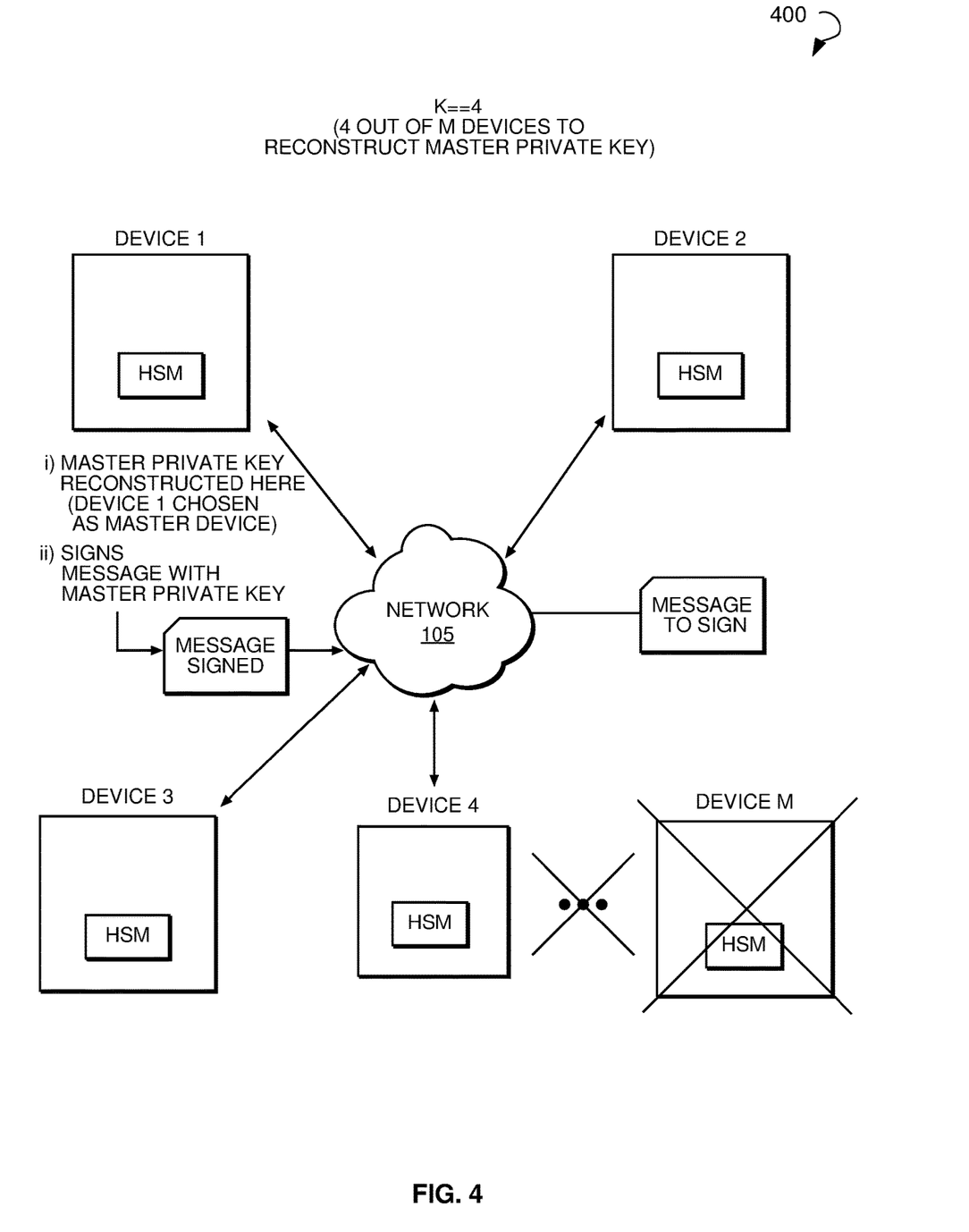
FIG. 4 illustrates another diagram of an exemplary system including a randomly selected master physical device of the plurality of individual physical devices with the master physical device reconstructing the master private key and signing a message with the master private key according to embodiments of the present technology.

FIG. 4 illustrates another diagram of an exemplary system 400 including a randomly selected master physical device of the plurality of individual physical devices with the master physical device reconstructing the master private key and signing a message with the master private key according to embodiments of the present technology. FIG. 4 shows K physical devices, each physical device comprising an HSM, and all the physical devices connected to the network 105. The physical devices may receive an input message. As an example, FIG. 4 shows 4 physical devices (i.e., K equals four): Device 1, Device 2, Device 3, and Device 4. In FIG. 4, Device 1 is randomly chosen as the master device. The master device (e.g., Device 1) cryptographically signs the input message with the reconstructed master private key and shares content of the signed message. Additionally, since a corresponding master public key is known, using the master public key any external observer can verify that the message has been correctly signed.

Figure 5:
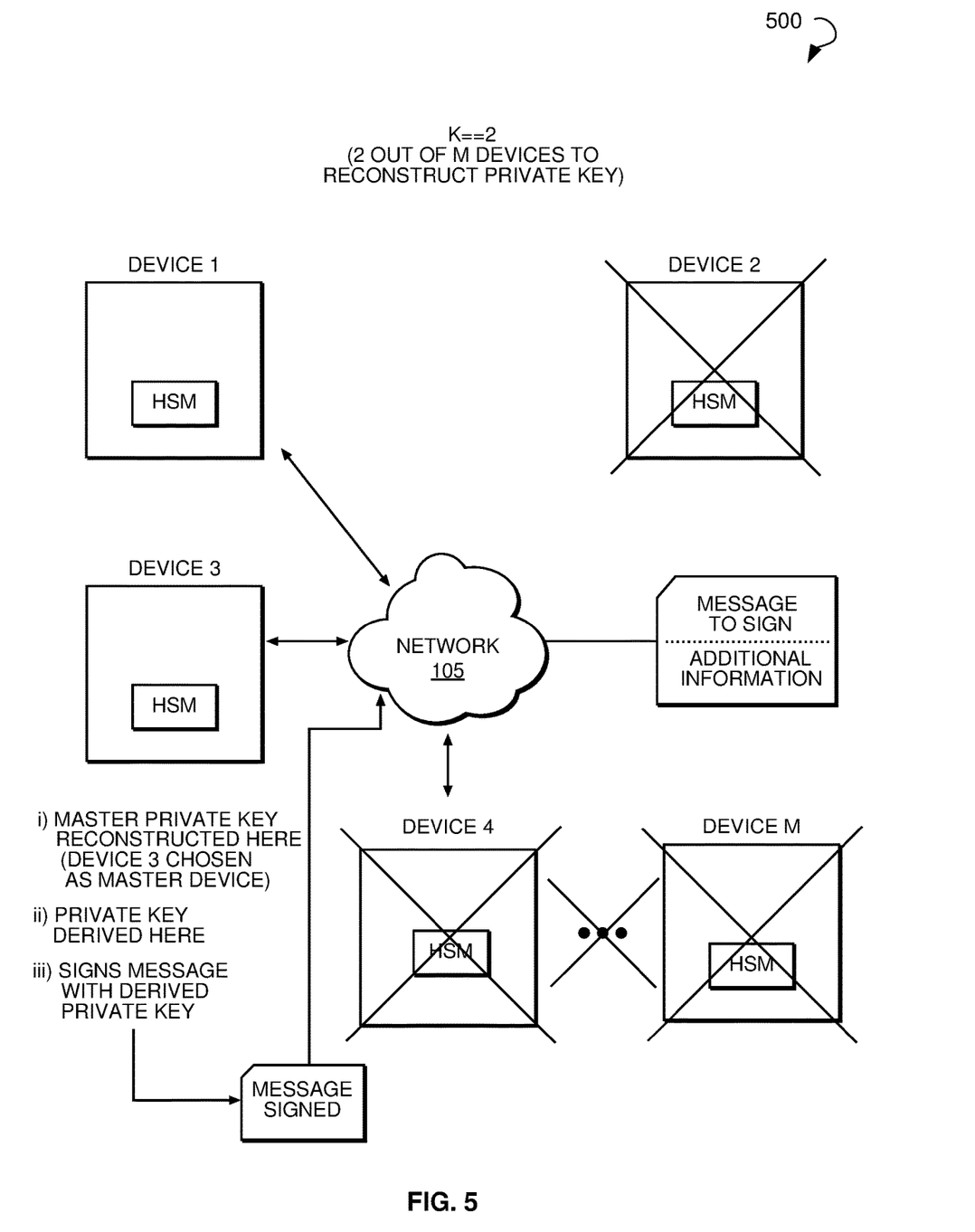
FIG. 5 shows another diagram of an exemplary system including a randomly selected master physical device of the plurality of individual physical devices with the master physical device constructing a derived private key and signing a message with the derived private key according to embodiments of the present technology.

FIG. 5 shows another diagram of an exemplary system 500 including a randomly selected master physical device of the plurality of individual physical devices with the master physical device constructing a derived private key and signing a message with the derived private key according to embodiments of the present technology. FIG. 5 shows K physical devices, with each physical device comprising an HSM, connected to the network 105. The physical devices receive an input message. For example, FIG. 5 shows 2 physical devices (K equals two): Device 1 and Device 3. FIG. 5 shows Device 3 as the randomly chosen master device. The master device (e.g., Device 3) cryptographically signs the input message with the derived private key and shares content of the signed message.

Figure 6:
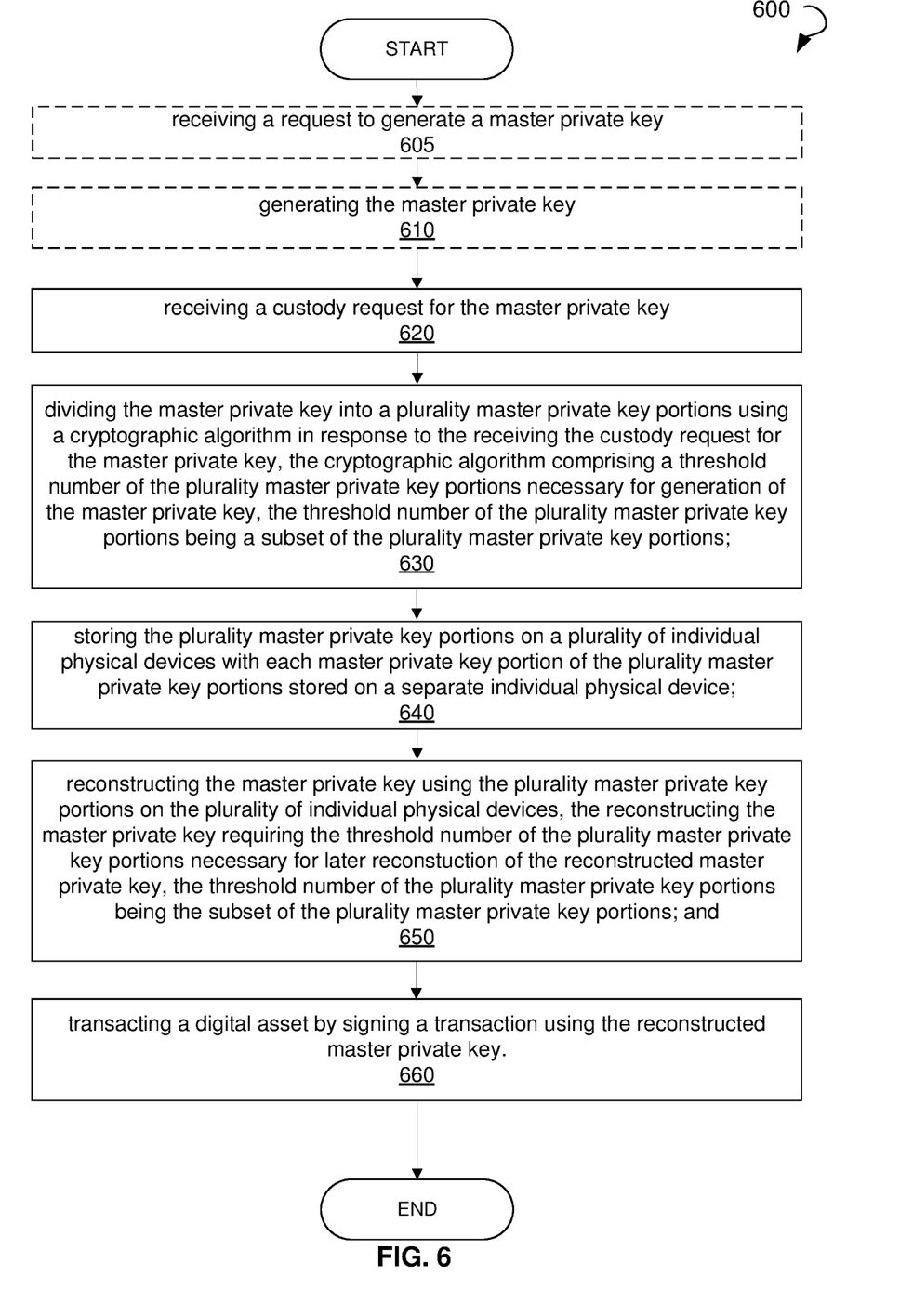
FIG. 6 depicts a process flow diagram showing a method for providing for secure creation, custody, recovery, and management of a digital asset according to embodiments of the present technology.

FIG. 6 depicts a process flow diagram showing a method for providing for secure creation, custody, recovery, and management of a digital asset according to embodiments of the present technology.

As shown in FIG. 6, the method 600 may commence at operation 605, receiving a request to generate a master private key. In various embodiments this operation may be optional.

At operation 610, optionally, the method 600 may proceed with generating a master private key. In various embodiments this operation may be optional because the master private key may already exist and does not need to be generated.

At operation 620, the method 600 may proceed with receiving a custody request for the master private key.

At operation 630, the method 600 may include dividing the master private key into a plurality master private key portions using a cryptographic algorithm in response to the receiving the custody request for the master private key, the cryptographic algorithm comprising a threshold number of the plurality master private key portions necessary for later reconstruction of the master private key, the threshold number of the plurality master private key portions being a subset of the plurality master private key portions.

At operation 640, the method 600 may proceed with storing the plurality master private key portions on a plurality of individual physical devices with each master private key portion of the plurality master private key portions stored on a separate individual physical device.

At operation 650, the method 600 may include reconstructing the master private key using the plurality master private key portions on the plurality of individual physical devices, the reconstructing the master private key requiring the threshold number of the plurality master private key portions necessary for generation of the reconstructed master private key, the threshold number of the plurality master private key portions being the subset of the plurality master private key portions.

At operation 660, the method 600 may include transacting a digital asset by signing a transaction using the reconstructed master private key.

Figure 7:
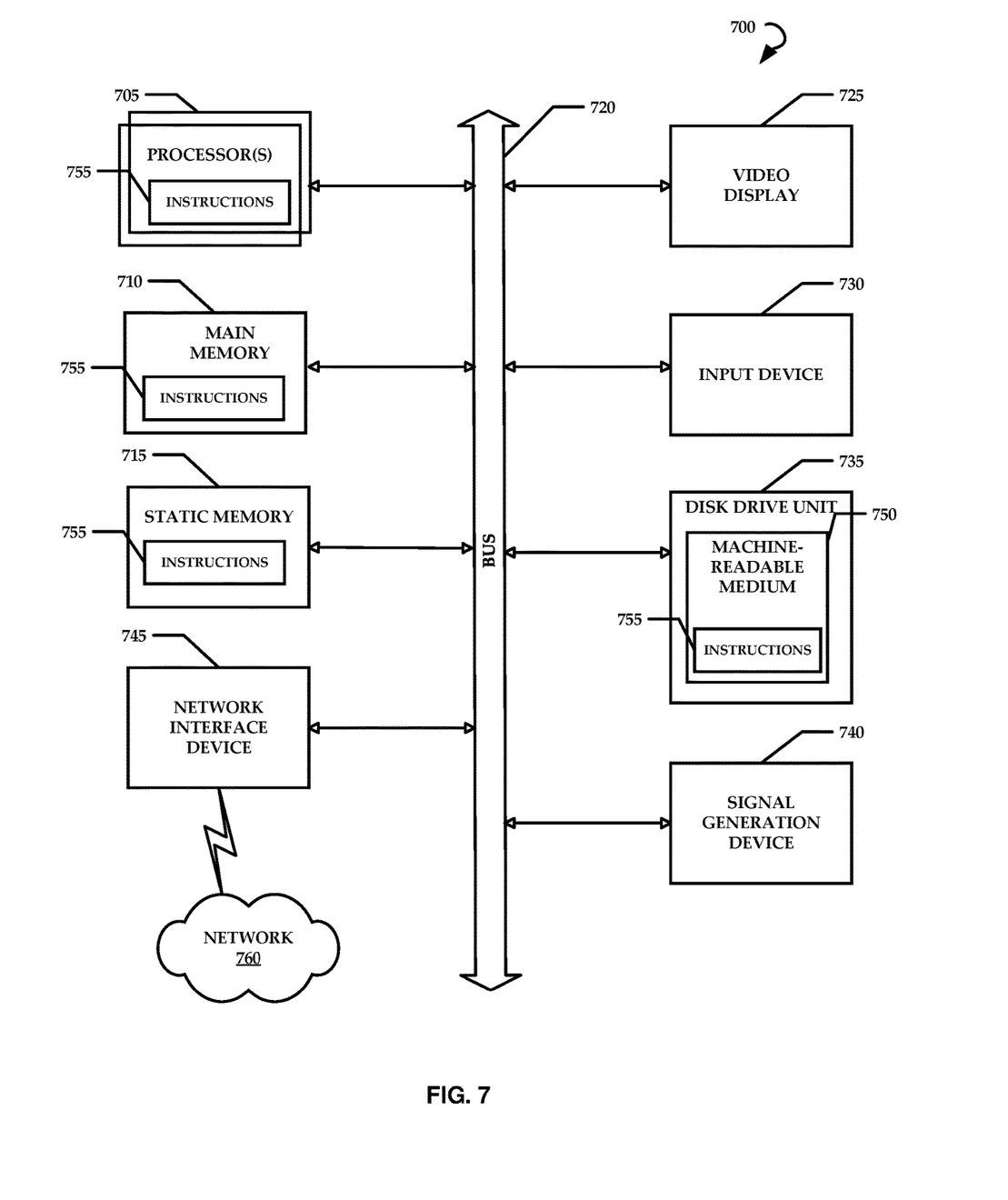
FIG. 7 illustrates an exemplary computer system that may be used to implement embodiments of the present technology.

FIG. 7 shows a diagrammatic representation of a computing device for a machine in the example electronic form of a computer system 700, within which a set of instructions for causing the machine to perform any one or more of the methodologies discussed herein can be executed. In example embodiments, the machine operates as a standalone device, or can be connected (e.g., networked) to other machines. In a networked deployment, the machine can operate in the capacity of a server, a client machine in a server-client network environment, or as a peer machine in a peer-to-peer (or distributed) network environment. The machine can be a personal computer (PC), tablet PC, game console, set-top box (STB), personal digital assistant (PDA), television device, cellular telephone, portable music player (e.g., a portable hard drive audio device), web appliance, or any machine capable of executing a set of instructions (sequential or otherwise) that specify actions to be taken by that machine. Further, while only a single machine is illustrated, the term "machine" shall also be taken to include any collection of machines that separately or jointly execute a set (or multiple sets) of instructions to perform any one or more of the methodologies discussed herein. Computer system 700 can be an instance of the device shown in FIGS. 1-5.

The example computer system 700 includes a processor or multiple processors 705 (e.g., a central processing unit (CPU), a graphics processing unit (GPU), or both), and a main memory 710 and a static memory 715, which communicate with each other via a bus 720. The computer system 700 can further include a video display unit 725 (e.g., a liquid-crystal display (LCD), organic light emitting diode (OLED) display, or a cathode ray tube (CRT)). The computer system 700 also includes at least one input device 730, such as an alphanumeric input device (e.g., a keyboard), a cursor control device (e.g., a mouse), a microphone, a digital camera, a video camera, and so forth. The computer system 700 also includes a disk drive unit 735, a signal generation device 740 (e.g., a speaker), and a network interface device 745.

The disk drive unit 735 includes a machine-readable medium 750 (also referred to as a computer-readable medium 750), which stores one or more sets of instructions and data structures (e.g., instructions 755) embodying or utilized by any one or more of the methodologies or functions described herein. The instructions 755 can also reside, completely or at least partially, within the main memory 710, static memory 715 and/or within the processor(s) 705 during execution thereof by the computer system 700. The main memory 710, static memory 715, and the processor(s) 705 also constitute machine-readable media.

The instructions 755 can further be transmitted or received over a communications network 760 via the network interface device 745 utilizing any one of a number of well-known transfer protocols (e.g., Hyper Text Transfer Protocol (HTTP), CAN, Serial, and Modbus). The communications network 760 includes the Internet, local intranet, Personal Area Network (PAN), Local Area Network (LAN), Wide Area Network (WAN), Metropolitan Area Network (MAN), virtual private network (VPN), storage area network (SAN), frame relay connection, Advanced Intelligent Network (AIN) connection, synchronous optical network (SONET) connection, digital T1, T3, E1 or E3 line, Digital Data Service (DDS) connection, Digital Subscriber Line (DSL) connection, Ethernet connection, Integrated Services Digital Network (ISDN) line, cable modem, Asynchronous Transfer Mode (ATM) connection, or an Fiber Distributed Data Interface (FDDI) or Copper Distributed Data Interface (CDDI) connection. Furthermore, communications network 760 can also include links to any of a variety of wireless networks including Wireless Application Protocol (WAP), General Packet Radio Service (GPRS), Global System for Mobile Communication (GSM), Code Division Multiple Access (CDMA) or Time Division Multiple Access (TDMA), cellular phone networks, Global Positioning System (GPS), cellular digital packet data (CDPD), Research in Motion, Limited (RIM) duplex paging network, Bluetooth radio, or an IEEE 802.11-based radio frequency network.

While the machine-readable medium 750 is shown in an example embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media. Such media can also include, without limitation, hard disks, floppy disks, flash memory cards, digital video disks, random access memory (RAM), read only memory (ROM), and the like.

The example embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software programs for implementing the present method can be written in any number of suitable programming languages such as, for example, Hypertext Markup Language (HTML), Dynamic HTML, XML, Extensible Stylesheet Language (XSL), Document Style Semantics and Specification Language (DSSSL), Cascading Style Sheets (CSS), Synchronized Multimedia Integration Language (SMIL), Wireless Markup Language (WML), Java™, Jini™, C, C++, C #, .NET, Adobe Flash, Perl, UNIX Shell, Visual Basic or Visual Basic Script, Virtual Reality Markup Language (VRML), ColdFusion™ or other compilers, assemblers, interpreters, or other computer languages or platforms.

Thus, the technology for providing secure creation, custody, recovery, and management of a digital asset is disclosed. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A method for secure creation, custody, recovery, and management of a digital asset, the method comprising:
    receiving a request to generate a master private key;
    generating the master private key;
    receiving a custody request for the master private key;
    dividing the master private key into a plurality master private key portions using a cryptographic algorithm in response to the receiving the custody request for the master private key, the cryptographic algorithm comprising a threshold number of the plurality master private key portions necessary for later reconstruction of the master private key, the threshold number of the plurality master private key portions being a subset of the plurality master private key portions;
    storing the plurality master private key portions on a plurality of individual physical devices with each master private key portion of the plurality master private key portions stored on a separate individual physical device;
    reconstructing the master private key using the plurality master private key portions on the plurality of individual physical devices, the reconstructing the master private key requiring the threshold number of the plurality master private key portions necessary for generation of the reconstructed master private key, the threshold number of the plurality master private key portions being the subset of the plurality master private key portions; and
    transacting a digital asset by signing a transaction using the reconstructed master private key;
    wherein the generating the master private key comprises:
    securely connecting a plurality of physical devices, the plurality of physical devices generating a plurality of digital secrets, the plurality of digital secrets corresponding to the plurality of physical devices; and
    randomly selecting a master physical device of the plurality of physical devices, the master physical device generating the master private key using the plurality of digital secrets of each of the plurality of physical devices in response to the request to generate the master private key.

2. The method of claim 1, wherein the digital asset is a cryptocurrency.

3. The method of claim 1, wherein the transacting the digital asset is transferring the digital asset.

4. The method of claim 1, wherein the cryptographic algorithm is Shamir's Secret Sharing (SSS).

5. The method of claim 1, wherein each of the plurality of individual physical devices further comprise a Hardware Security Module (HSM).

6. The method of claim 5, wherein the storing the plurality master private key portions on the plurality of individual physical devices further comprises:
    using the Hardware Security Module (HSM) on each of the plurality of individual physical devices.

7. The method of claim 1 further comprising taking custody of the master private key, the taking custody of the master private key comprising:
    receiving a custody request for the master private key;
    securely connecting a plurality of physical devices;
    dividing the master private key into a plurality master private key portions using a cryptographic algorithm;
    storing portions of the plurality master private key portions on the plurality of physical devices; and
    allowing for later reconstruction of the master private key using a threshold number of the plurality master private key portions.

8. The method of claim 1, wherein the transacting the digital asset by signing the transaction using the reconstructed master private key comprises:
    receiving a request to sign a message;
    signing the message, by the master physical device, using the reconstructed master private key in response to the request to sign the message; and
    sharing content of the message in response to the signing the message.

9. The method of claim 8, further comprising generating a master public key corresponding to the master private key.

10. The method of claim 9, wherein the transacting the digital asset by signing the transaction using a private key derived by the reconstructed master private key comprises:
    receiving a request to sign a message and additional information to derive the private key;
    signing the message, by the master physical device, using the private key derived by the reconstructed master private key in response to the request to sign the message; and
    sharing content of the message in response to the signing the message.

11. The method of claim 10, further comprising:
    generating a public key corresponding to the private key derived from the master private key.

12. A system for secure creation, custody, recovery, and management of a digital asset, the system comprising:
    at least one processor; and
    a memory storing processor-executable instructions, wherein the at least one processor is configured to implement the following operations upon executing the processor-executable instructions:
    receiving a request to generate a master private key;
    generating the master private key, the generating the master private key comprising:
        securely connecting a plurality of physical devices, the plurality of physical devices generating a plurality of digital secrets, the plurality of digital secrets corresponding to the plurality of physical devices; and
        randomly selecting a master physical device of the plurality of physical devices, the master physical device generating the master private key using the plurality of digital secrets of each of the plurality of physical devices in response to the request to generate the master private key;
    receiving a custody request for the master private key;

dividing the master private key into a plurality master private key portions using a cryptographic algorithm in response to the receiving the custody request for the master private key, the cryptographic algorithm comprising a threshold number of the plurality master private key portions necessary for later reconstruction of the master private key, the threshold number of the plurality master private key portions being a subset of the plurality master private key portions;

storing the plurality master private key portions on the plurality of physical devices with each master private key portion of the plurality master private key portions stored on a separate individual physical device;

reconstructing the master private key using the plurality master private key portions on the plurality of physical devices, the reconstructing the master private key requiring the threshold number of the plurality master private key portions necessary generation of the reconstructed master private key, the threshold number of the plurality master private key portions being the subset of the plurality master private key portions; and transacting a digital asset by signing a transaction using the reconstructed master private key.

13. The system of claim 12, wherein the at least one processor is further configured to implement the following operations upon executing the processor-executable instructions:

taking custody of the master private key, the taking custody of the master private key comprising:

receiving a custody request for the master private key;

securely connecting a plurality of physical devices;

dividing the master private key into a plurality master private key portions using a cryptographic algorithm;

storing portions of the plurality master private key portions on the plurality of physical devices; and allowing for later reconstruction of the master private key using a threshold number of the plurality master private key portions.

14. The system of claim 12, wherein the transacting the digital asset by signing the transaction using the reconstructed master private key comprises:

receiving a request to sign a message;

signing the message, by the master physical device, using the reconstructed master private key in response to the request to sign the message; and sharing content of the message in response to the signing the message.

15. The system of claim 12, wherein the at least one processor is further configured to implement the following operations upon executing the processor-executable instructions:

generating a master public key corresponding to the master private key.

16. The system of claim 15, wherein the transacting the digital asset by signing the transaction using a private key derived by the reconstructed master private key comprises:

receiving a request to sign a message and additional information to derive the private key;

signing the message, by the master physical device, using the private key derived by the reconstructed master private key in response to the request to sign the message; and sharing content of the message in response to the signing the message.

17. The system of claim 16, wherein the at least one processor is further configured to implement the following operations upon executing the processor-executable instructions:

generating a public key corresponding to the private key derived from the master private key.

* * * * *